US006731859B1

(12) United States Patent
Honjo

(10) Patent No.: US 6,731,859 B1
(45) Date of Patent: May 4, 2004

(54) METHOD AND APPARATUS FOR REPRODUCTION OF VIDEO INFORMATION

(75) Inventor: Masahiro Honjo, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/206,845

(22) Filed: Dec. 7, 1998

(30) Foreign Application Priority Data

Dec. 5, 1997 (JP) .............................................. 9-335361

(51) Int. Cl.[7] ................................................. H04N 5/93
(52) U.S. Cl. ......................................... 386/52; 386/111
(58) Field of Search ....................... 386/6–8, 33, 68–70, 386/81–82, 111–112, 125–126

(56) References Cited

U.S. PATENT DOCUMENTS

| 5,543,934 | A | * | 8/1996 | Takeuchi et al. ............ 386/104 |
| 5,596,420 | A | * | 1/1997 | Daum ......................... 386/110 |
| 5,621,840 | A | * | 4/1997 | Kawamura et al. ......... 386/111 |
| 5,732,183 | A | * | 3/1998 | Sugiyama ...................... 386/4 |
| 5,784,518 | A | * | 7/1998 | Ogura ......................... 386/68 |
| 5,854,873 | A | * | 12/1998 | Mori et al. .................. 386/92 |
| 5,899,579 | A | * | 5/1999 | Park ........................... 386/94 |
| 5,917,988 | A | * | 6/1999 | Eto ............................. 386/52 |
| 5,959,690 | A | * | 9/1999 | Toebes, VIII et al. ...... 348/578 |
| 6,240,137 | B1 | * | 5/2001 | Kato ...................... 375/240.26 |
| 6,256,451 | B1 | * | 7/2001 | Mitsui .......................... 386/52 |
| 6,337,880 | B1 | * | 1/2002 | Cornog et al. ......... 375/240.01 |
| 6,341,192 | B1 | * | 1/2002 | Fujinami ..................... 386/52 |

FOREIGN PATENT DOCUMENTS

WO        96/17492        *   6/1996

* cited by examiner

Primary Examiner—Thai Tran
Assistant Examiner—Polin Chieu
(74) Attorney, Agent, or Firm—RatnerPrestia

(57) ABSTRACT

In the skip reproduction from a frame X in a first access unit (XGOP) to a frame Y in a second access unit (YGOP), a reproduction method stores a front data and the data onward YGOP while display of frame X is maintained. Then, a front frame (I-picture) and onward is decoded and displayed in YGOP. Another reproduction method decodes the front frame (I-picture) to the frame Y in YGOP, and keeps on displaying the frame X instead of displaying the decoded frames until the frame Y is decoded. At the time when the frame Y is decoded, display of the coded frames starts. A further reproduction method does not decode the bi-directionally predictive coded frames between the front frame and the frame Y in YGOP. These respective methods can improve accuracy of a reproduced motion in the skip reproduction and reduce a freezing time of displaying a picture from which the skip starts.

20 Claims, 6 Drawing Sheets

METHOD AND APPARATUS FOR REPRODUCTION OF VIDEO INFORMATION

FIELD OF THE INVENTION

The present invention generally relates to a reproduction method and a reproduction apparatus for video signals as well as audio signals, and more particularly to the method and apparatus that skip some of the displayed pictures when the data coded through the MPEG method are reproduced.

BACKGROUND OF THE INVENTION

According to the promulgated standard of MPEG coding method, three coding methods are available for coding video signals, i.e. intra frame coding method, predictive coding method and bi-directionally predictive coding method. The pictures coded by the respective methods are referred to as I-picture, P-picture and B-picture. When a picture including I-picture is collected to form a group called a group of pictures (GOP), motion picture information that takes a large capacity can be coded efficiently.

In a conventional MPEG reproducing method, coded data have been decoded and processed in a unit of a GOP or a unit of access that comprises not less than one GOP. For instance, when a frame Y is reproduced following after a distant frame X, a skip from X to Y is practiced. The skip is controlled in a unit of a GOP, more specifically, in a unit of access to data stored in a medium. The skip from the frame X to frame Y thus cannot expect a high accuracy. This is described hereinafter with reference to FIG. 5.

Figure 5:
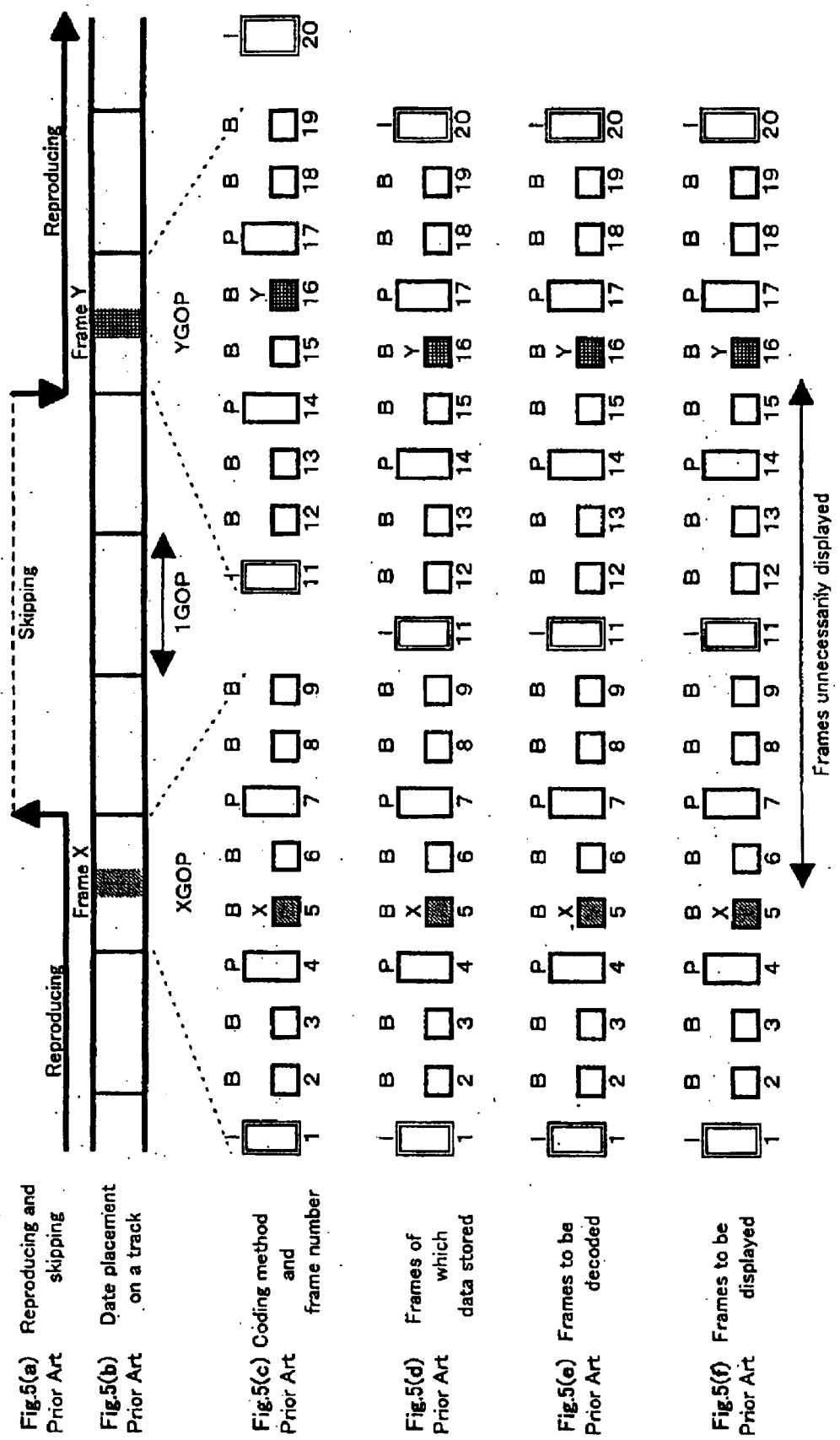

First, a conventional method is described that illustrates the conventional reproduction method. FIG. 5(*a*) shows a skip reproducing operation of the data coded with the MPEG method on tracks of a disc storage medium such as an optical disc. This is an example of the case where data coded with the MEPG method are stored and placed in a storage medium.

FIG. 5(*b*) shows data placement on a track of the disc. In this case, one GOP is handled as an access unit to the data on the track. Assume that a frame X and a distant frame Y is sequentially reproduced by skipping, where the frame X belongs to XGOP, a first GOP, and the frame Y belongs to a distant YGOP, a second GOP.

FIG. 5(*c*) illustrates a structure of a GOP in a unit of a frame, where nine frames constitute one GOP. The GOP shown in FIG. 5(*c*) comprises the following frames:

one intra coded frame (I-picture);

two predictive coded frames (P-pictures); and six bi-directionally predictive coded frames (B-pictures).

Each frame is indicated with one block in FIG. 5(*b*), and respective frames are identified with the letters "I", "P" and "B" above the respective blocks. Each frame of respective GOPs is numbered 1–9, and 11–19.

Assume that the frame X is the fifth frame (B-picture) of XGOP, and the frame Y is the sixth frame (B-picture) of YGOP.

FIGS. 5(*d*), 5(*e*) and 5(*f*) show the frames in which data are stored, the frames to be decoded, and the frames to be displayed when a skip is practiced from XGOP including the frame X to YGOP including the frame Y, and these two frames are reproduced sequentially. In these figures, each frame is identified and numbered in the same manner as in FIG. 5(*c*).

As shown in FIG. 5(*a*), alter XGOP is reproduced, some GOPs are skipped before the data immediately before the YGOP's starting point are reproduced. In this operation, as shown in FIG. 5(*d*), the data of a frame 11 (I-picture) is placed immediately after the frame 9.

Regarding a decoding operation, as shown in FIG. 5(*e*), every frame where data are stored, as shown in FIG. 5(*d*), is decoded. Regarding a display operation, as shown in FIG. 5(*e*) and FIG. 5(*f*), every decoded frame is displayed.

As described above, YGOP is reproduced following XGOP, i.e. pictures are reproduced in a unit of a GOP, more specifically, in an access unit to the data stored in the storage medium.

In this conventional way, however, the frames 6–15 are often displayed as shown in FIG. 5(*f*) although they are displayed unnecessarily. A frame and its distant frame are thus not reproduced in sequence as requested. This is a problem of the conventional art.

SUMMARY OF THE INVENTION

The present invention provides a method and an apparatus with which unnecessary displayed frames can be reduced so that an accuracy of skip reproduction can be improved.

When the frames between X in XGOP and Y in YGOP are skipped, the data are decoded and displayed in the following manner.

(a) At the time when the frame X is decoded and displayed, stop the decoding process of XGOP, and freeze the display of frame X, then skip toward the frame Y in YGOP. Store the front data (i.e., the data situated at the beginning of the frame) and onward in YGOP into a storage medium, and decode as well as display the front frame and onward in YGOP.

(b) Keep on displaying the frame X, while storing the front data and onward in YGOP. Decode but not display the front frame of the I-picture in YGOP to the frame Y therein. At the time when the frame Y is decoded, start displaying the decoded frames.

(c) Keep from being decoded the bi-directionally coded frames between the first frame of YGOP and the frame Y, but decode all the frames including and after the frame Y.

This method improves the accuracy of skip reproducing, and reduces the freezing time of displaying a picture from which the skip starts.

BRIEF DESCRIPTION OF THE INVENTION

Figure 1:
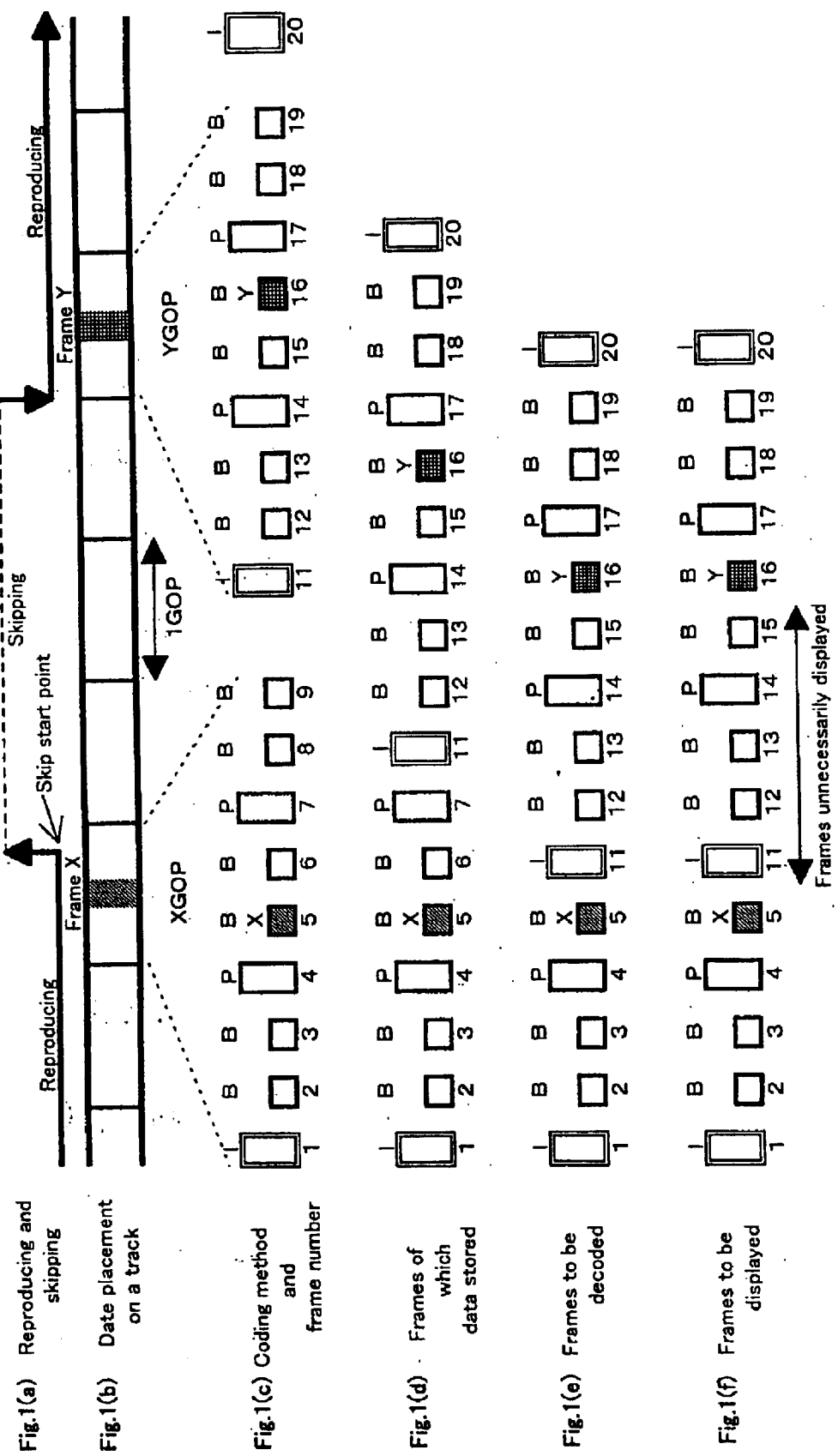

FIGS. 1(*a*)–(*f*) illustrate schematically a method of reproduction utilized in a first exemplary embodiment of the present invention.

Figure 2:
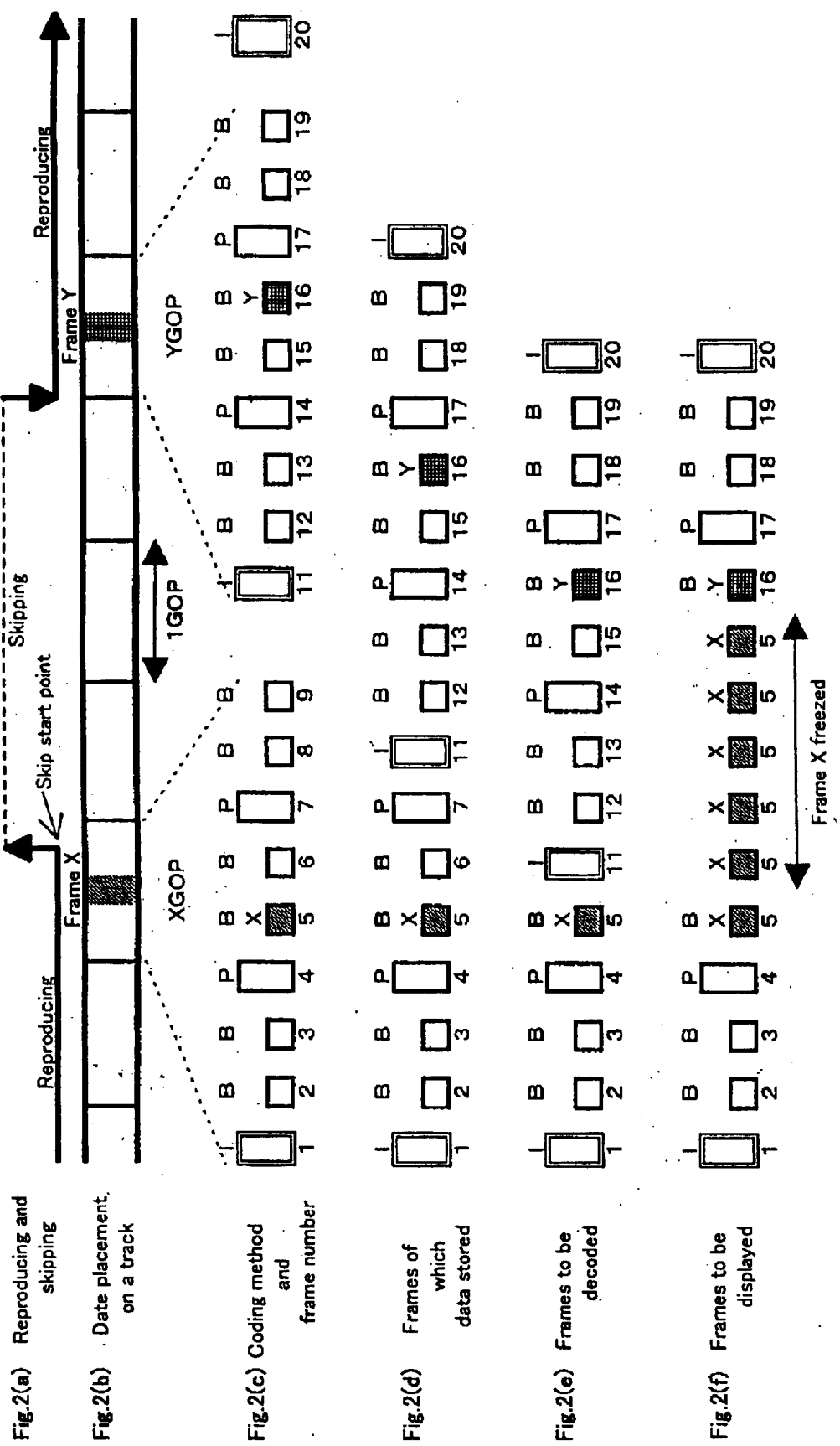

FIGS. 2(*a*)–(*f*) illustrate schematically a second exemplary embodiment.

Figure 3:
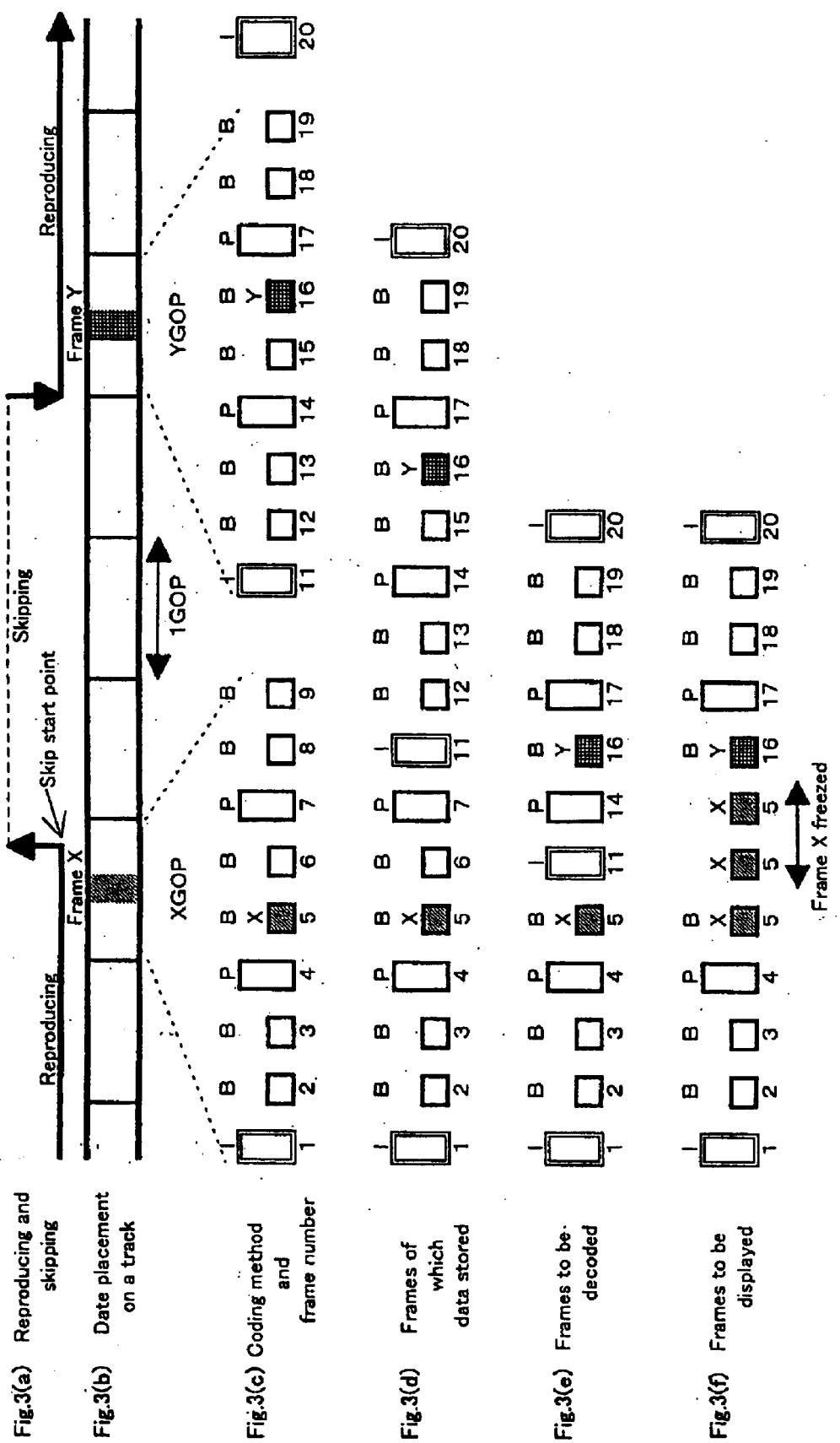

FIGS. 3(*a*)–(*f*) illustrate schematically a third exemplary embodiment.

Figure 4:
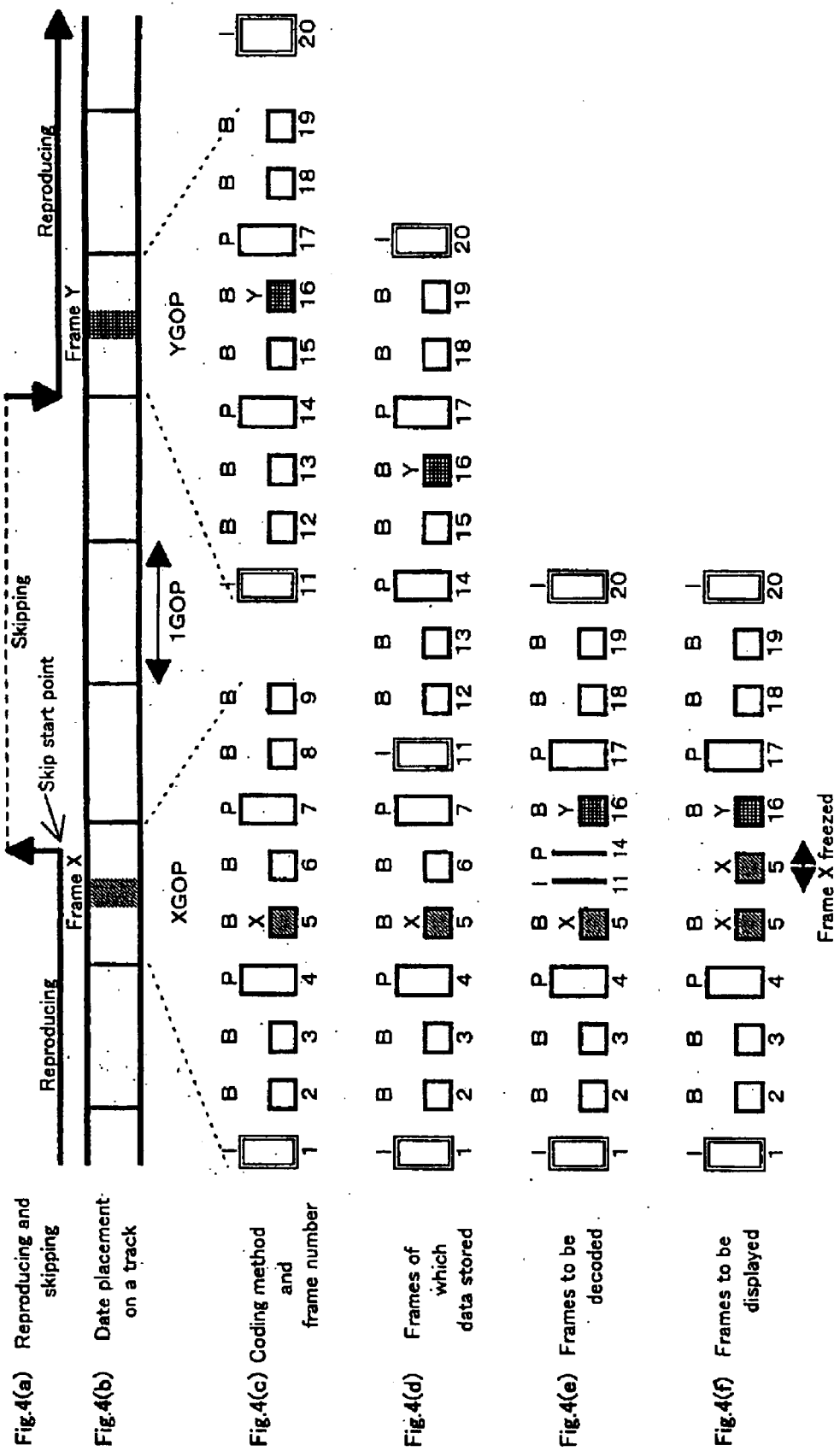

FIGS. 4(*a*)–(*f*) illustrate schematically a fourth exemplary embodiment.

FIGS. 5(*a*)–(*f*) illustrate schematically a conventional method of reproduction.

Figure 6:
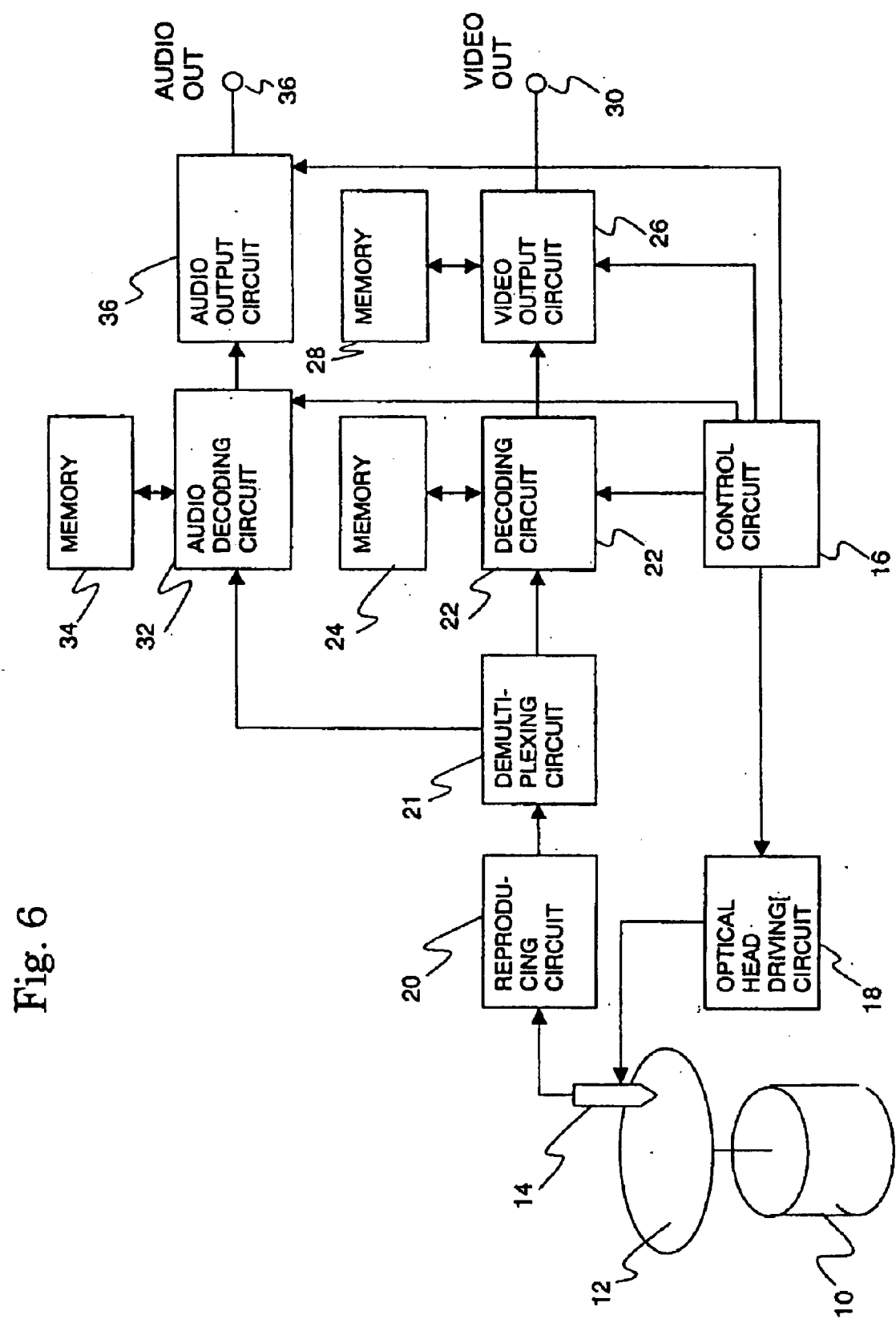

FIG. 6 is a block diagram illustrating a reproduction apparatus employing the reproduction method of the present invention.

DESCRIPTION OF THE PREFERRED EMBODIMENT

Exemplary embodiments of the present invention are described hereinafter with reference to the figures.

FIGS. 1(a), 2(a), 3(a) and 4(a) relate to the skip operation;

FIGS. 1(b), 2(b), 3(b) and 4(b) relate to data placement on tracks of a storage medium; and FIGS. 1(c)–(f), 2(c)–(f), 3(c)–(f) and 4(c)–(f) relate to structure of the GOP.

In each drawing, one GOP comprises 9 frames, i.e.

one intra coded frame (I-picture);

two predictive coded frames (P-pictures); and six bi-directionally predictive coded frames (B-pictures).

Each frame is indicated with one block in these drawings, and respective frames are identified with the letters "I", "P" and "B" above the respective blocks. Each frame of respective GOPs is numbered 1–9, and 11–19.

FIGS. 1(a)–(f) illustrate schematically a reproduction method utilized in a first exemplary embodiment of the present invention. In FIGS. 1(a)–(f), the following point differs from what is described in FIGS. 5(a)–(f). A skip from a frame X in XGOP to a frame Y in YGOP is practiced through the steps below:

1. Decode the frame X, and stop the decoding process of XGOP when the frame X is displayed.
2. Practice the skip.
3. Store the data from the front data and onward in YGOP.
4. Decode and display the front frame and onward in YGOP.

In FIG. 1(e), at the completion of decoding the frame X, the data storage process is probably progressed to a frame slightly ahead as shown in FIG. 1(d) that illustrates the data up to a seventh frame have been stored.

At the time when the frame X is decoded and displayed, a skip is started. In FIG. 1(a), a jump starts earlier than that in FIG. 5(a).

Then, while the frame X is displayed, decode the data of an 11$^{th}$ frame, and display the following frames sequentially. Accordingly, unnecessary frames 11–15 (5 frames) are displayed, which is less than 9 frames displayed by the conventional method shown in FIG. 5. This is an advantage of the present invention.

Regarding the decoding process, frames (P-frames of 4$^{th}$ and 7$^{th}$ frames) desirable for decoding the frame X have been decoded in advance.

The second exemplary embodiment of the present invention is described with reference to FIGS. 2(a)–(f).

In FIGS. 2(a)–(f), the following point differs from what described with regard to FIGS. 1(a)–(f): Keep on displaying the frame X until the frame Y is decoded. In other words, the steps 1-3 described in the first exemplary embodiment are followed by the steps 4 and 5 described below:

4. Keep on displaying the frame X during the decoding process of the front frame (I-picture) of YGOP to the frame Y.
5. Start displaying the decoded frames when the frame Y is decoded.

The data storing and decoding operations in this case are the same as in the first exemplary embodiment shown in FIGS. 1(a)–(f). In other words, each frame is decoded as shown in FIG. 2(e); however, regarding the display, the display of frame X is frozen until the frame Y is decoded as shown in FIG. 2(f). This method can eliminate unnecessary frames before being displayed. This exemplary embodiment has yet a freezing period of frame X corresponding to a period of five frames; however it practically reduces unnecessary frame to be displayed. As a result, an accuracy of skip reproduction is improved from a unit of GOP to a unit of frame.

The third exemplary embodiment is described hereinafter with reference to FIGS. 3(a)–(f).

In this exemplary embodiment, the bi-directionally predictive coded frames (B-pictures) between the first frame of YGOP to which the frame Y belongs and the frame Y are not decoded, but every frame including and after the frame Y is decoded.

In this exemplary embodiment, the following point differs from what described in the second exemplary embodiment shown in FIGS. 2(a)–(f). B-pictures prior to the frame Y are not decoded as shown in FIG. 3(e), because this non-decoding does not negatively affect the decoding process of the frames ahead.

This contributes to a substantial reduction or the time taken until the frame Y is decoded.

In the example shown in FIG. 3(e), after the 11$^{th}$ frame (I-picture) and 14$^{th}$ frame (P-picture) are decoded, the frame Y is decoded and displayed. In this case, the freezing display time of frame X corresponds to two frames, which is far less than that described in the second exemplary embodiment shown in FIGS. 2(a)–(f). As a result, an accuracy of the skip reproduction is further improved, i.e. the freezing display time of a frame from which the skip starts can be reduced.

The fourth exemplary embodiment is described with reference to FIGS. 4(a)–(f).

In this exemplary embodiment, between the front frame in YGOP to which the frame Y belongs and the frame Y, not less than one frame is decoded during one frame period.

A difference from the third exemplary embodiment shown in FIGS. 3(a)–(f) is the following point. As shown in FIG. 4(e), the 11$^{th}$ and 14$^{th}$ frames are decoded faster than others that take normal decoding process. In this exemplary embodiment, these two frames are decoded with a doubled speed from the normal process. As a result, two frames can be decoded in one frame period, and regarding the displayed frame, as shown in FIG. 4(f), the display of 5$^{th}$ frame is frozen only once, whereby further improvement can be obtained. If the decoding can be processed much faster, the freezing display period is further reduced.

This exemplary embodiment assures that the freezing display time of the frame from which the skip is started call be further reduced.

In the second and third exemplary embodiments, this fast decoding method can be employed, thereby to reduce the freezing display time of the frame from which the skip is started.

The above and previous exemplary embodiments describe about video reproduction of the frame X and the distant frame Y in sequence. This exemplary embodiment handles audio reproduction.

The skip reproduction of video data entails interrupting audio data. Therefore, the interrupted period of audio data desirably receives some measures. Even the time taken for the skip can be reduced through the present invention, the measures are still desirable. The audio data in the interrupted period are processed through the following method.

(a) Decrease substantially the audio volume between near the frame X and frame Y, i.e. a mute process is provided.

(b) Decrease and then increase the audio volume gradually, i.e. fade-out and fade-in processes are provided.

These measures are provided to the frames between near the frame X and near the frame Y. These frames can be corresponded to the freezing display period of frame X described in the exemplary embodiments 2, 3 and 4.

The audio noise produced in the skip reproduction of video data can be thus reduced.

The structure of GOP is not limited to the above description. The access unit to data is handled as one GOP in the above exemplary embodiments. When the access unit comprises plural GOPs, e.g. XGOP of the present invention includes plural GOPs each of which includes plural intra-frame coded frames, the principle of skip reproduction employed in the present invention can be applied. Each of XGOP and YGOP does not necessarily comprise a single GOP, but can be a data access unit comprising plural GOPs.

The frame X and frame Y are not limited to a frame of B-picture, but can be frames of P-picture or I-picture.

A frame is used as a unit in the processes described in the exemplary embodiments; however, a field can be used as a unit without any concept changes of the present invention.

A reproduction apparatus employing the reproduction method described in the above exemplary embodiments is explained hereinafter with reference to FIG. 6.

The reproduction apparatus in FIG. 6 comprises a known circuit that reproduces the signals recorded in the MPEG format on an optical disc into bit streams, then decodes the resultant hit streams before outputting. The skip-reproduction operation proper to the present invention is described here.

In FIG. 6, an optical disc 12 is driven by a driver 10. According to an instruction from a control circuit 16, an optical head driving circuit 18 moves an optical head from frame X to frame Y, more specifically to YGOP. Data reproduced by a reproduction circuit 20 is separated by a multiplex separation circuit 21 into coded video signals and coded audio signals that are stored respectively into a video decoding memory 24 and audio decoding memory 32. During a skip operation, a video decoding circuit 22, a video output circuit 26, an audio decoding circuit 32 and an audio output circuit 36 operate based on an instruction from the control circuit 16 as below, and follow the respective first to fourth methods of display processing previously described.

(a) in the case of the first method of display processing (described in Exemplary Embodiment 1)

As shown in FIG. 1(e), the video decoding circuit 22 decodes the data stored in the video decoding memory 24 by following the procedure as below:

decode the data prior to the frame X in XGOP, keep the data posterior to the frame X from being decoded, and decode again the data from the front frame ($11^{th}$ frame) and onward of YGOP.

The video output circuit 26 displays videos by following the procedure as below:

keep on displaying the videos of frame X stored in the memory 28 until the $11^{th}$ frame is decoded, display the videos of decoded frames sequentially after the $11^{th}$ frame is decoded.

(b) in the case of the second method of display processing (described in Exemplary Embodiment 2)

As shown in FIG. 2(c), the video decoding circuit 22 works in the same procedure as described in the first method.

The video output circuit 26 displays videos in the procedure as follows:

keep on displaying the videos of frame X stored in the memory 28 until the frame Y is decoded, display the videos of decoded frames after the frame Y is decoded.

(c) in the case of the third method of video processing (described in Exemplary Embodiment 3)

As shown in FIG. 3(e), the video decoding circuit 22 works in the same procedure as described in the first and second methods; however, the circuit 22 keeps from being decoded the frames of B-pictures prior to the frame Y in YGOP.

The video output circuit 26 works in the same procedure as described in the second method, and the time necessary to keep on displaying the video of frame X is shorter than that in the second method.

(d) in the case of the fourth method of video processing (described in Exemplary Embodiment 4)

As shown in FIG. 4(e), the video decoding circuit 22 works in the same procedure as described in the third method. In addition to this, the circuit 22 decodes the $11^{th}$ and $14^{th}$ frames in YGOP as fast as two times speed of other frames.

The video output circuit 26 works in the same procedure as described in the third method, and the time necessary to keep on displaying the video of frame X is shorter than that in the third method.

(e) in the case of audio processing (described in Exemplary Embodiment 5)

An audio decoding circuit 32 decodes audio frames by using an audio decoding memory 34. The frames to be decoded correspond to the frames decoded through the methods 1–4 of video processing.

An audio output circuit 36 follows an instruction from the control circuit 36 and works in the procedure below during the skip between frame X and frame Y.

1. Decrease substantially the audio volume between near the frame X and near the frame Y, i.e. a mute process is provided.

2. Decrease and then increase the audio volume between the same range gradually, i.e. fade-out and fade-in processes are provided.

The above exemplary embodiments referred to a disc such as an optical disc as a storage medium; however, the storage media according to the present invention are not limited to disc shaped media such as an optical disc, magneto-optical disc, hard disc and the like. The concept of the present invention can be employed to semiconductor memories, for example, and other storage media as well as the reproduction apparatuses using these storage media.

The above descriptions prove that the present invention can provide a method of reproduction method and an apparatus thereof with which an accuracy of skip reproduction is improved and with which a freezing time of displaying the picture from which the skip starts is reduced.

What is claimed is:

1. A method of reproduction wherein video signals are coded with at least one of an intra-frame coding method, a predictive coding method and a bi-directionally predictive coding method to form a plurality of group of pictures (GOPs), said method comprising the steps of:

(a) providing signaling to cause skipping from a frame X in a first of said GOPs past at least a skipped one of said GOPs, and to a frame Y in a second of said GOPs;

(b) displaying frames from a beginning of said first of said GOPs through the frame X, said frame X away from an end of said first of said GOPs;

(c) decoding from a beginning of a second of said GOPs; and (d) maintaining display of said frame X until said frame Y is displayed, said frame Y away from a beginning of said second of said GOPs.

2. The method of reproduction as defined in claim 1, wherein frames other than bi-directionally coded frames among the frames from the beginning of the second of said GOPs are decoded, and frames including and after said frame Y is decoded.

3. The method of reproduction as defined in claim 1, wherein audio volume is decreased while said frame X is displayed both before and after said frame X is displayed.

4. The method of reproduction as defined in claim 2, wherein audio volume is decreased while said frame X is displayed both before and after said frame X is displayed.

5. The method of reproduction as defined in claim 1, wherein audio volume is decreased and then increased while said frame X is displayed both before and after said frame X is displayed.

6. The method of reproduction as defined in claim 2, wherein audio volume is decreased and then increased while said frame X is displayed both before and after said frame X is displayed.

7. The method of reproduction as defined in claim 1, wherein audio volume is decreased while said frame X is displayed.

8. The method of reproduction as defined in claim 2, wherein audio volume is decreased while said frame X is displayed.

9. The method of reproduction as defined in claim 1, wherein audio volume is decreased and then increased while said frame X is displayed.

10. The method of reproduction as defined in claim 2, wherein audio volume is decreased and then increased while said frame X is displayed.

11. A reproduction apparatus for performing reproduction of video signals coded with at least one of an intra-frame coding method, a predictive coding method and a bi-directionally predictive coding method to form a plurality of group of pictures (GOPs), comprising:

signaling means for
   providing signaling to cause skipping from a frame X in a first of said GOPs past at least a skipped one of said GOPs and to a frame Y in a second of said GOPs;
   means for displaying frames from a beginning of said first of said GOPs through the frame X, said frame X away from an end of said first of said GOPs for decoding from a beginning of a second of said GOPs; and
   for maintaining display of said frame X until said frame Y is displayed, said frame Y away from beginning of said second of said GOPs.

12. A reproduction apparatus according to claim 11, wherein said apparatus decodes frames other than bi-directionally coded frames among the frames from the beginning of the second of said GOPs, and frames including and after said frame Y.

13. A reproduction apparatus according to claim 11, wherein audio volume is decreased while said frame X is displayed both before and after said frame X is displayed.

14. A reproduction apparatus according to claim 12, wherein audio volume is decreased while said frame X is displayed both before and after said frame X is displayed.

15. A reproduction apparatus according to claim 11, wherein audio volume is decreased and then increased while said frame X is displayed both before and after said frame X is displayed.

16. A reproduction apparatus according to claim 12, wherein audio volume is decreased and then increased while said frame X is displayed both before and after said frame X is displayed.

17. A reproduction apparatus according to claim 11, wherein audio volume is decreased while said frame X is displayed.

18. A reproduction apparatus according to claim 12, wherein audio volume is decreased while said frame X is displayed.

19. A reproduction apparatus according to claim 11, wherein audio volume is decreased and then increased while said frame X is displayed.

20. A reproduction apparatus according to claim 12, wherein audio volume is decreased and then increased while said frame X is displayed.

* * * * *

UNITED STATES PATENT AND TRADEMARK OFFICE
CERTIFICATE OF CORRECTION

PATENT NO. : 6,731,859 B1 Page 1 of 1
DATED : May 4, 2004
INVENTOR(S) : Masahiro Honjo It is certified that error appears in the above-identified patent and that said Letters Patent is hereby corrected as shown below:

<u>Title page,</u>
Item [57], ABSTRACT,
Lines 3 and 4, between "onward" and "YGOP", insert -- in --.

Signed and Sealed this

Eighth Day of February, 2005

JON W. DUDAS
*Director of the United States Patent and Trademark Office*